United States Patent
Bradbury et al.

[11] Patent Number: 6,125,680
[45] Date of Patent: Oct. 3, 2000

[54] RIVET TOOL ADJUSTABLE RIVET DELIVERY DEVICE

[75] Inventors: James M. Bradbury, Waterbury; David J. Banducci, Guilford; David S. Calkins, Branford; John O'Hara, Seymour; Peter Thomas, Chesine, all of Conn.

[73] Assignee: Emhart Inc., Newark, Del.

[21] Appl. No.: 09/189,220

[22] Filed: Nov. 11, 1998

Related U.S. Application Data

[60] Provisional application No. 60/105,074, Oct. 21, 1998.

[51] Int. Cl.[7] .............................. B21J 15/10; B23P 21/00
[52] U.S. Cl. .................... 72/391.6; 72/453.19; 29/812.5; 227/2; 227/112
[58] Field of Search ................................ 72/391.4, 391.6, 72/453.19; 29/812.5, 709, 720; 227/51, 2, 112

[56] References Cited

U.S. PATENT DOCUMENTS

| | | |
|---|---|---|
| 2,943,335 | 7/1960 | Daniel et al. . |
| 3,088,618 | 5/1963 | Pickford . |
| 3,095,106 | 6/1963 | Morrison . |
| 3,254,522 | 6/1966 | Elliott et al. . |
| 3,367,166 | 2/1968 | Newton et al. . |
| 3,415,102 | 12/1968 | Elliott . |
| 3,457,763 | 7/1969 | Freeman . |
| 3,580,457 | 5/1971 | Henshaw . |
| 3,630,067 | 12/1971 | Henshaw . |
| 3,886,783 | 6/1975 | Hirsch . |
| 3,932,931 | 1/1976 | Wright . |
| 4,027,520 | 6/1977 | Klein . |
| 4,062,217 | 12/1977 | Ebbert et al. . |
| 4,163,311 | 8/1979 | Sigmund . |
| 4,178,669 | 12/1979 | Hara et al. . |
| 4,180,195 | 12/1979 | Caley et al. . |
| 4,205,547 | 6/1980 | Yamasaka . |
| 4,275,582 | 6/1981 | Sheffield et al. . |
| 4,275,583 | 6/1981 | Gilbert et al. . |
| 4,577,794 | 3/1986 | Armstrong et al. . |
| 4,592,136 | 6/1986 | Hirsch . |
| 4,604,889 | 8/1986 | Sukharevsky . |
| 4,628,722 | 12/1986 | Mauer et al. . |
| 4,630,460 | 12/1986 | Mauer . |
| 4,747,294 | 5/1988 | Schwartz et al. . |
| 4,754,643 | 7/1988 | Weeks, Jr. et al. . |
| 4,790,470 | 12/1988 | Miles . |
| 4,811,881 | 3/1989 | Heck . |
| 4,972,985 | 11/1990 | Smart et al. . |
| 5,009,354 | 4/1991 | D'Aquila et al. . |
| 5,035,353 | 7/1991 | Smart et al. ............................ 29/812.5 |
| 5,036,576 | 8/1991 | Gast . |
| 5,327,639 | 7/1994 | Wing et al. ............................ 29/812.5 |
| 5,400,942 | 3/1995 | Gast et al. . |
| 5,653,368 | 8/1997 | Miles et al. ............................ 72/391.6 |

OTHER PUBLICATIONS

*PRG620 Electric "Pop" Riveter* Instruction Manual (revised Oct. 1963); United Shoe Machinery Corp., Fastener Division, Shelton, CT.

*Primary Examiner*—David Jones
*Attorney, Agent, or Firm*—Harness, Dickey & Pierce, P.L.C.

[57] ABSTRACT

A rivet delivery device is provided for transferring a rivet from a rivet passage to a nose piece of a pulling head and jaw case mechanism. The rivet delivery device is air driven to extend forwardly of the rivet setting tool and rotates to present a rivet in front of the jaws and then transfers the rivet into the jaws. The angular rotation and stroke length of the rivet delivery device can be easily adjusted. A double-acting piston is driven in both directions by positive air pressure to extend and rotate the delivery device in front of the nose piece and returning the rivet delivery device after rivet transfer. The use of a double-acting piston greatly enhances the speed at which the, rivet delivery device can operate.

16 Claims, 9 Drawing Sheets

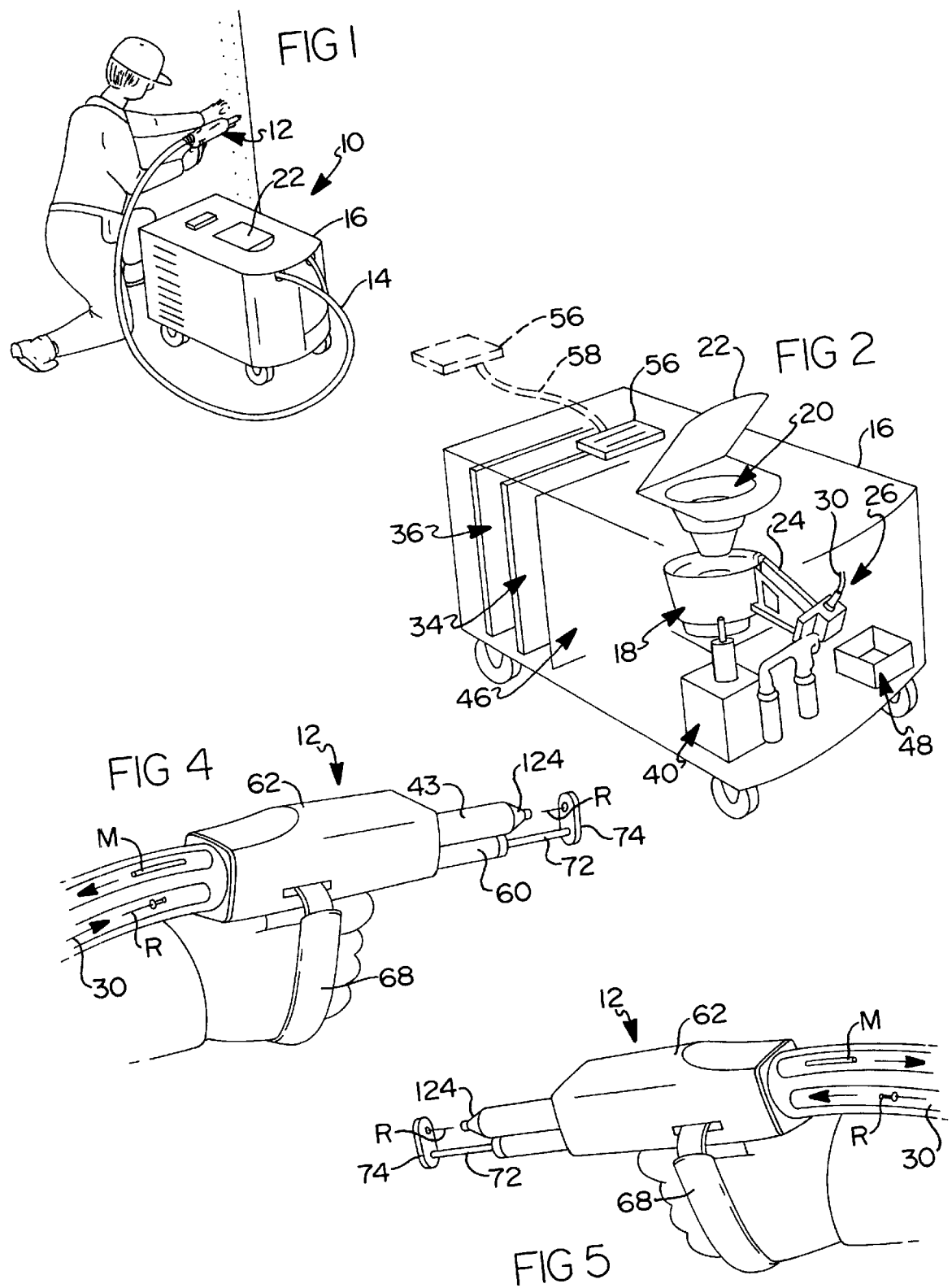

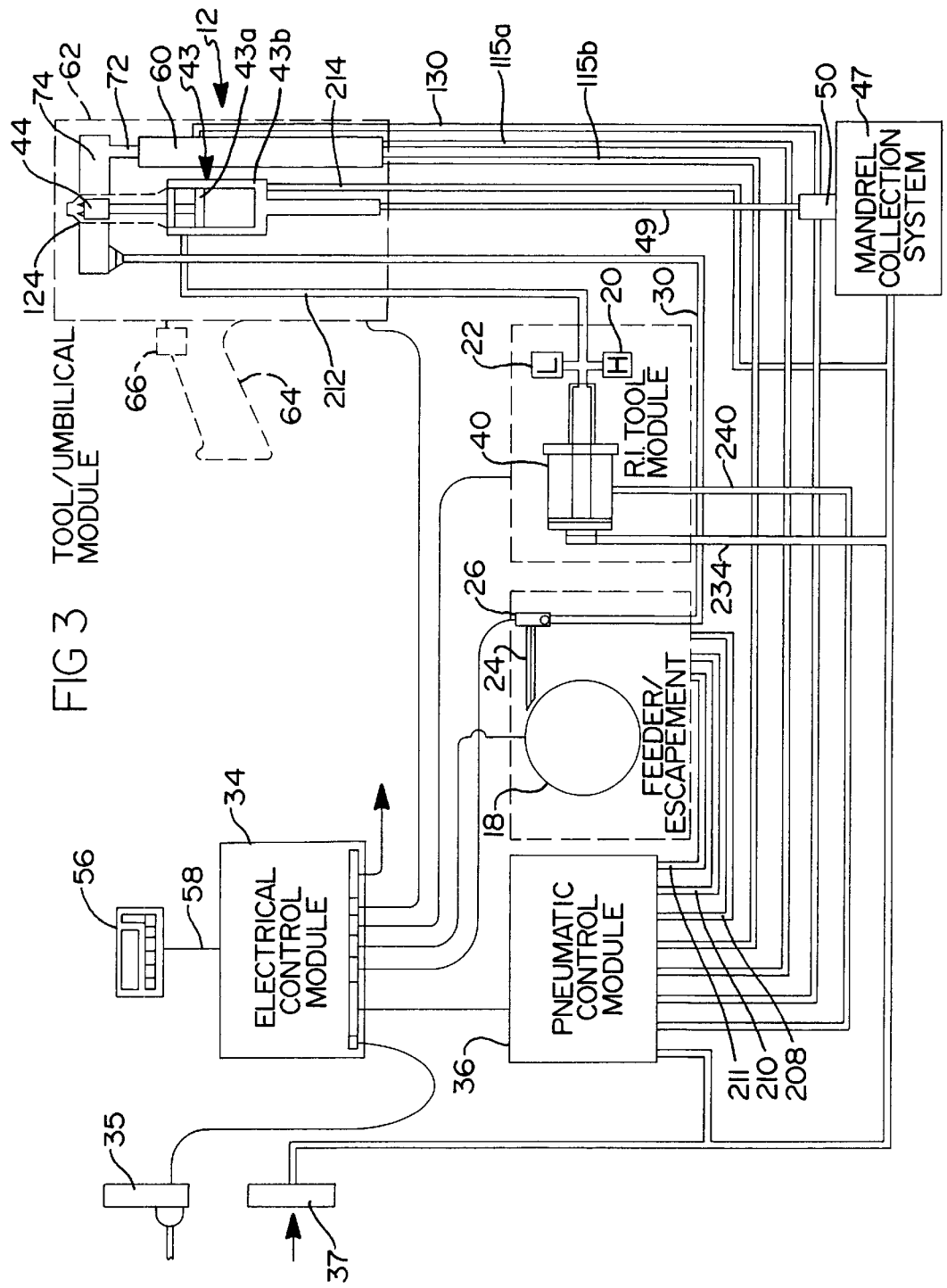

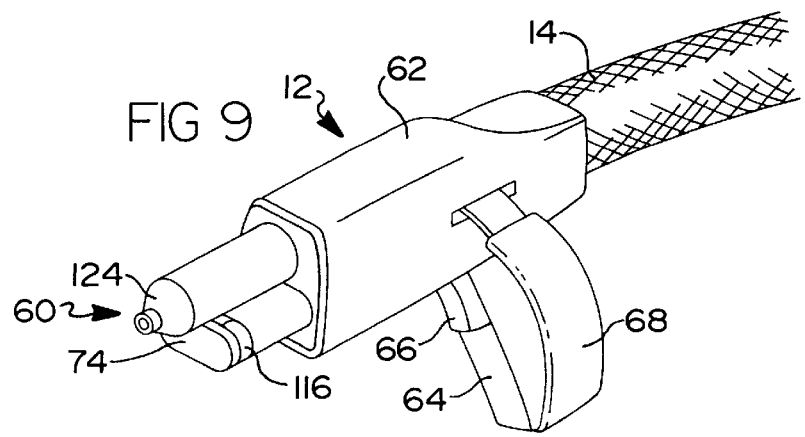
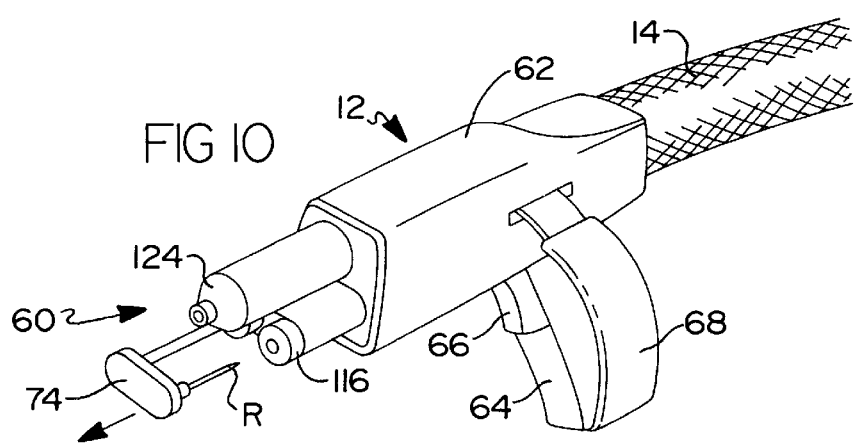
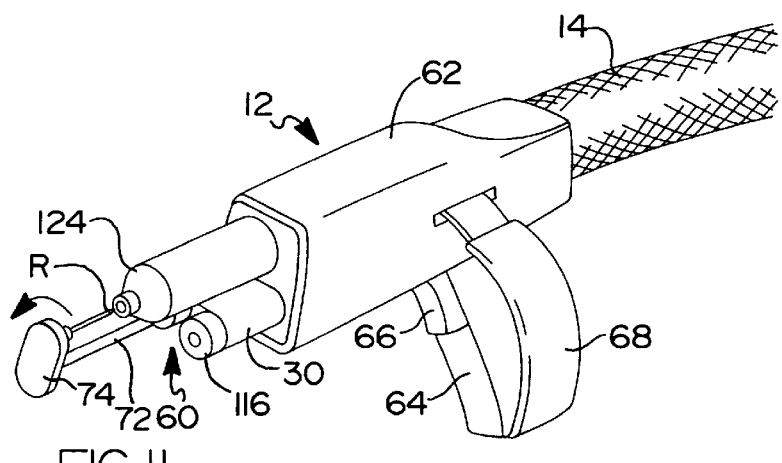

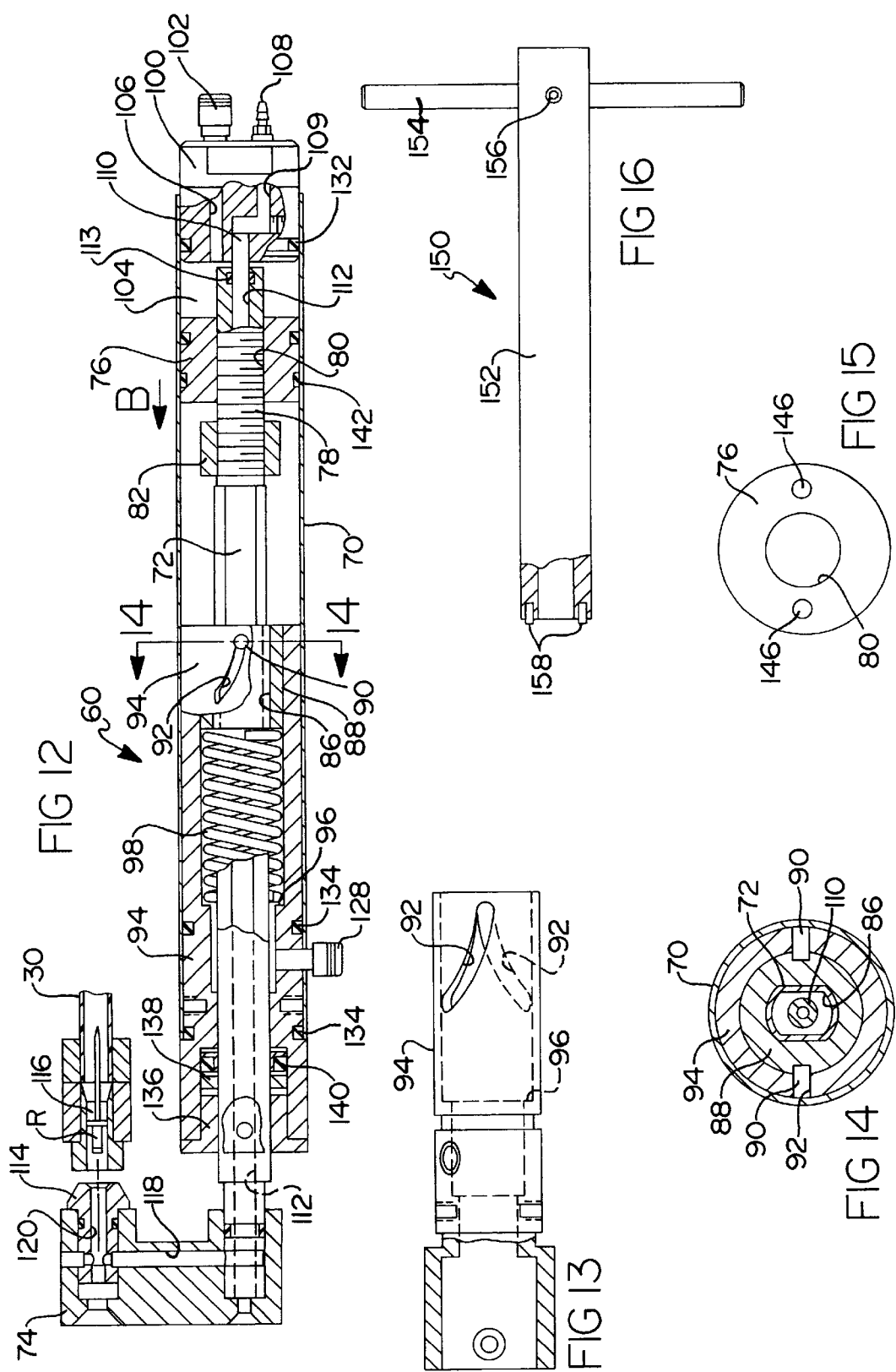

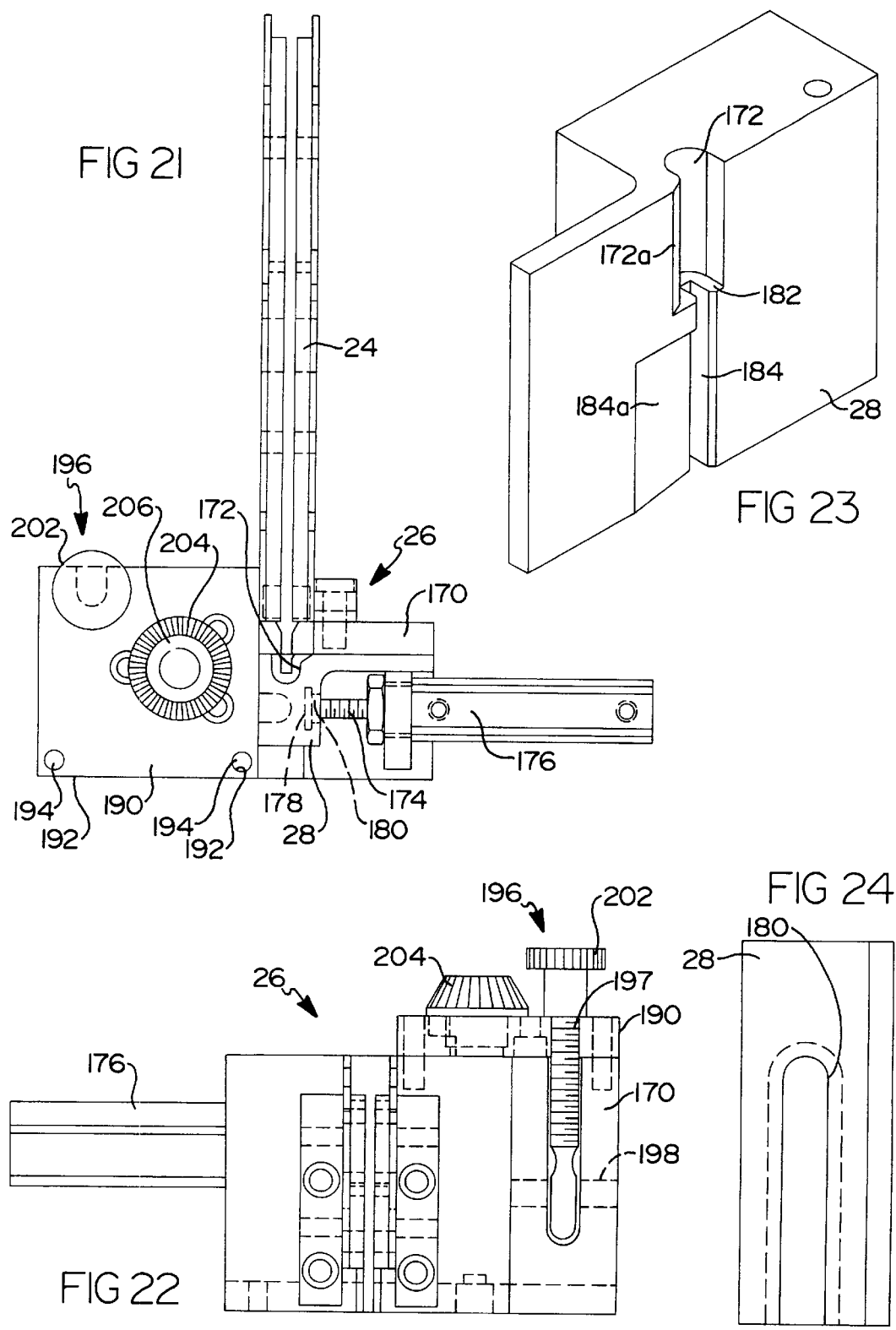

RIVET TOOL ADJUSTABLE RIVET DELIVERY DEVICE

This application claims the benefit of provisional application No. 60/105,074, filed on Oct. 21, 1998.

BACKGROUND OF THE INVENTION

1. Field of the Invention

The present invention relates generally to riveting machines, and more particularly to a portable riveting system with an autofeed mechanism for automatically supplying rivets to an application tool and methods for operating the riveting system.

2. Background and Summary of the Invention

A blind rivet comprises a tubular rivet body in which is mounted a mandrel having a head portion at the narrow end of the stem so that when the mandrel is pulled back in the rivet, it upsets the rivet. When pulling-back of the mandrel is resisted with a predetermined force, the mandrel breaks off. A riveter that operates with such rivets typically has a housing formed at its front end with an aperture through which the rivet mandrel is engaged. Within the housing is a chuck that engages tightly around the mandrel and an actuating mechanism or pulling head which pulls the chuck backwardly, thereby upsetting the rivet and breaking off the mandrel.

In rivet setting machines, the operator sets a rivet held in the nose of the rivet tool by pulling a trigger. The remaining spent mandrel is drawn through the tool and through a collection tube into a collection box. A proximity switch senses the spent mandrel just before it enters the collection box.

There are a variety of different types of tools, both manual and powered, that are used to set pull-type blind fasteners. For industrial production, it is desirable to use a power tool that may have an air/hydraulic or electrical power assist to pull the mandrel stem. This facilitates the rivet setting operation.

It is known to automate the process of feeding rivets to the riveter tool, as for example shown in U.S. Pat. Nos. 4,754,643 and 4,747,294, commonly assigned. It is also known to automate the mandrel collection process as taught, for example, in U.S. Pat. No. 4,972,985, also commonly assigned. The most common approach to automatic rivet feed and disposal uses hydraulically or pneumatically powered mechanisms for guiding blind rivets to the riveting tool and extracting broken off mandrels therefrom.

Common shortcomings of prior art apparatus for auto-feeding of rivets to the riveting tool is the failure of such systems to take into account the need for rapid adjustment, improved maintenance, serviceability and rapid change-over capability. In addition, ways are constantly being sought which speed up the reload capabilities as well as speeding up the rivet setting process.

In furthering the above and additional objects, the present invention provides a rivet setting tool including an automatic rivet delivery device for transferring a rivet from a rivet passage to a nose piece of the rivet setting tool. The rivet delivery device is air driven to extend forwardly of the nose of the setting jaws, and rotates to present a rivet in front of the jaws and then transfers the rivet into the jaws in known manner. The rivet delivery device extends through the rear of a hand tool so that its angular rotation can be adjusted without disassembling the tool. The stroke length of the rivet delivery device can also be easily adjusted.

A further feature of the rivet delivery device is the provision of a double-acting piston driven in both directions by positive air pressure to extend and rotate the delivery device in front of the nose piece and returning the rivet delivery device after rivet transfer. The use of a double-acting piston greatly enhances the speed at which the rivet delivery device can operate. Furthermore, the ability to adjust the stroke length or angular rotation of the rivet delivery device without disassembling the entire tool, greatly increases the ability to rapidly adjust the rivet delivery device in order to change over to different sized rivets or to simply make minor adjustments.

The system of the present invention also includes a portable housing and a hand tool connected to the portable housing. The portable housing includes electronic and pneumatic modules for controlling the supply of electric and pneumatic power to a rivet feeding device and to the hand tool. In response to the activation and release of a trigger switch on the hand tool, blind rivets are supplied from a feeder bowl via a track to a reciprocating escapement mechanism which transfers successive rivets from the track to a tube through which they are moved by compressed air to a rivet delivery device located on the hand tool. The different components of the portable autofeed riveting system are designed to be separately detachable from the housing as a modular unit so that the independent modular units can be easily disassembled from the housing and can be replaced by replacement modules so that the rivet setting tool experiences as little down time as necessary.

The portable rivet setting system of the present invention is also provided with an escapement mechanism which includes a nesting block slidably received by a housing and including a recessed portion for receiving and supporting a fastener therein. The nesting block can be easily changed in just a few seconds in order to accommodate a different sized rivet. The ability to rapidly change the nesting block reduces the amount of time required for change over, and thereby increases the efficiency of the overall riveting system.

The rivet setting tool of the present invention is provided with a pulling head which employs air pressure to return the piston to its full forward position and is connected to a remote intensifier via a hydraulic hose. The remote intensifier includes an air piston disposed in a piston chamber and a hydraulic ram connected to the air piston and extending into a hydraulic passage connected to the hydraulic hose. The air piston has a larger cross-sectional area than the hydraulic ram which allows the intensifier to generate a large hydraulic pressure from a relatively small air pressure. A first supply of pressurized gas communicates with a first end of the piston chamber and a second supply of pressurized gas communicates with a second end of the piston chamber. The second end of the piston chamber is vented to atmosphere around a piston chamber sleeve. The second supply of pressurized gas is utilized to provide a low pressure bubble of air on top of the air piston in order to assist the return of the piston of the pulling head to a retracted position while increasing the speed of the piston's return. The speed at which the air piston returns to its retracted position is directly related to the speed at which the rivet setting tool is reset in order to receive and set another rivet.

The rivet setting tool of the present invention is also provided with a control strategy whereby when a trigger is depressed, a controller instructs the remote pulling head back in order to set a rivet. The jaws engage the rivet mandrel and start the setting process. As hydraulic pressure builds, a high and a low pressure switch witness the increase in pressure as setting occurs, and set a latch. When the high pressure switch drops low again, the controller deduces that the rivet has set. Activation pressure to the remote intensifier is then stopped and return air is started causing the tools pulling head to return concurrently. The controller starts a mandrel collection window to monitor the collection of the mandrel. As the tool jaws open, the mandrel is released and a vacuum draws the mandrel past a mandrel sensor and into the collection bin. As the mandrel passes the mandrel sensor, the mandrel collection window is reset. The rivet delivery device loads a new rivet into the nose piece of a tool as the tool returns full forward. Since the high setting/loading speed makes it possible to have as many as two mandrels in the collection path at once, two separate mandrel collection windows are required, with the first becoming available for the third rivet as soon as the first mandrel passes the mandrel sensor. These two timers (windows) are continuously reused again and again throughout the process. If a jam were to inhibit collection of the mandrels as witnessed by the window timing out before the mandrel sensor detects a mandrel's passage, the system will shut down.

The pressure switches allow the system of the present invention to determine if there is a rivet loaded in the nose of the tool since no sensor is provided in the nose of the tool. During the setting process, the system confirms that a rivet has been loaded by monitoring the pressure switches. If the switches detect pressure within a short period of time, i.e., within an amount of time for the pulling head to travel almost fully back, it knows a rivet was presented and proceeds as above. If there were no rivet in the nose of the rivet setting tool, when the trigger is activated, the switches would see no build-up of pressure within the setting window and would not start a mandrel collection window, but would rather initiate the rivet delivery device reloading sequence.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is perspective view of an operator using the portable autofeed riveting system of the present invention;

FIG. 2 is a perspective view of the portable autofeed riveting system of the present invention, illustrating the different modular components of the system according to the principles of the present invention;

FIG. 3 is a schematic view of each of the modules of autofeed riveting system of the present invention and showing the connections therebetween;

FIG. 4 is a perspective view from the right side of the rivet setting tool according to the principles of the present invention;

FIG. 5 is a perspective view from the left side of the rivet setting tool according to the principles of the present invention;

FIGS. 9–11 are left side perspective views illustrating the rivet delivery device in three different operating positions, respectively;

FIG. 12 is a cross-sectional view of the rivet delivery device according to the principles of the present invention;

FIG. 13 is a partial sectional view of the cam sleeve of the rivet delivery device according to the principles of the present invention;

FIG. 14 is a cross-sectional view taken along line 14—14 of FIG. 12;

FIG. 15 is an end view of the piston of the rivet delivery device according to the principles of the present invention;

FIG. 16 is a side view of a rivet delivery device adjustment tool according to the principles of the present invention;

FIG. 21 is a top view of the rivet guide track and escapement mechanism according to the principles of the present invention;

FIG. 22 is a side view of the escapement mechanism according to the principles of the present invention illustrating the thumb screw for securing the top plate in its assembled position;

FIG. 23 is a perspective view of the nesting block of the escapement mechanism according to the principles of the present invention;

FIG. 24 is a side view of the nesting block shown in FIG. 23, illustrating the slot which receives the head of the driver rod according to the principles of the present invention;

DETAILED DESCRIPTION OF THE PREFERRED EMBODIMENTS

Figure 17:
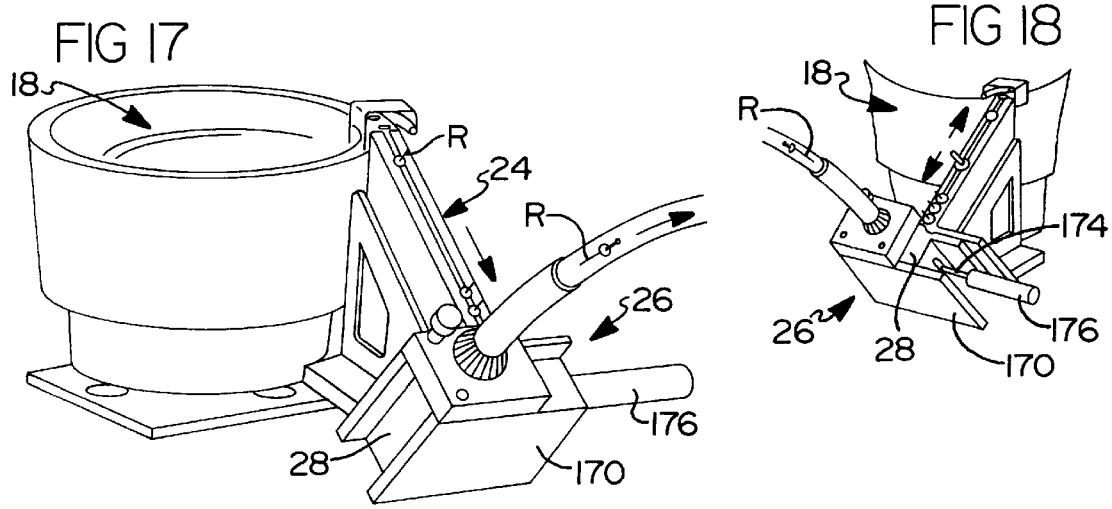
FIG. 17 is a perspective view of a feeder bowl and escapement mechanism according to the principles of the present invention.
Figure 18:
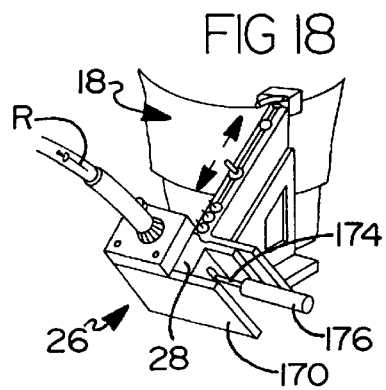
FIG. 18 is a perspective view from a different angle of the feeder bowl and escapement mechanism shown in FIG. 17.

With reference to FIGS. 1–27, a detailed description of the portable autofeed riveting system 10 of the present invention will be described. The portable autofeed riveting system 10 includes a rivet setting tool 12 connected via an umbilical 14 to a portable housing 16 which houses a rivet feeder bowl 18 preferably of the vibratory type. The rivet feeder bowl 18, best shown in FIGS. 17 and 18, is automatically fed rivets in bulk by a rivet hopper 20 which is disposed in a top portion of the housing 16 and is covered by a pivotally mounted cover 22. Rivets delivered from the bulk supply in the vibratory bowl are stacked in an inclined feed track 24, which accumulates a supply of rivets for escapement mechanism 26. The rivet escapement mechanism 26, which will be described in greater detail herein, includes a reciprocating nesting block 28 (see FIGS. 17–24) which periodically advances a rivet to a rivet delivery tube 30. The rivet delivery tube 30 extends through umbilical 14 and delivers rivets, via pneumatic pressure, to the rivet setting tool 12 which will be described in greater detail herein.

The portable autofeed riveting system 10 also includes an electrical panel/module 34 to which are mounted key electrical components of the riveting system. Electrical control module 34 is connected to an external power source 35. A pneumatic panel/module 36 is provided which supports key pneumatic components of the riveting system. The pneumatic control module 36 is connected to a main source of pressurized air 37 such as a compressor. The electrical panel 34 and pneumatic panel 36 are both supported by slots disposed in the bottom and top of the housing 16. Electrical panel 34 includes a plurality of terminals which are engaged by electrical connectors which connect to the remaining components and modules of the riveting system 10. A remote intensifier module 40 is provided in the housing 16 and provides hydraulic pressure through a hydraulic hose 42 which is disposed in the umbilical 14 and is connected to an installation tool including a pulling head 43 which engages a jaw case 44 for setting a rivet.

A barrier 46 is provided in the housing 16 for partitioning the housing 16 into two separate enclosed portions. The first enclosed portion houses the electrical and pneumatic panels 34, 36, while the second portion houses the rivet feeder bowl 18 escapement mechanism 26, rivet hopper 20, remote intensifier 40, and mandrel collection system 47. The mandrel collection system 47 includes a collection bin 48 and a mandrel return tube 49 which is connected to the rivet setting tool 12 and receives a mandrel which is released by the jaw case of the rivet setting tool 12. A mandrel sensor 50 is provided adjacent to the mandrel return line 49 for sensing the return of a mandrel into the mandrel collection system 47.

An operator interface 56 is optionally mounted to the housing 16, or if used in special applications such as with a workbench, can be pulled away from the housing 16 with a tether-like electrical cord 58, as best shown in phantom in FIG. 2. The operator interface 56 can be provided with a magnetized backing, a hook and loop-type fastener, or other known fastening systems, for supporting the operator interface to the housing 16 or to other surfaces such as a workbench or a cabinet.

The rivet setting tool 12 includes a rivet delivery device 60 as shown in FIGS. 3–12. The rivet delivery device 60 is mounted within a handheld housing 62 which includes a handle portion 64 with a trigger switch 66. A grip strap 68 is mounted to the handle portion 64 and is adjustable in order to assist an operator in holding onto the rivet setting tool 12. The grip strap 68 can be mounted on either side of the housing 62 as illustrated in FIGS. 4 and 5.

As best shown in FIG. 12, the rivet delivery device 60 includes a body tube 70 which receives a rod 72 which supports a delivery arm 74. The rod 72 of rivet delivery device 60 is connected to a piston 76 which reciprocates within body tube 70. The rod 72 has a threaded end portion 78 which is threadedly attached to an internally threaded portion 80 of the piston 76. A piston stop member (cam actuator) 82 is provided with internal threads which engage threaded portion 78 of rod 72. The rod 72 has a main body portion provided with a generally round cross-section with dual opposing flats (best shown in the cross-section view of FIG. 14) and is slidably received within a corresponding opening 86 which has a generally round cross section with dual opposing flats in a cam follower 88. Cam follower 88 supports a pair of dowel pins 90 on opposite sides thereof which engage a cam slot 92 disposed in a radially outwardly disposed concentric cam sleeve 94. Cam sleeve 94 includes an internal shoulder portion 96 which provides a seat portion for a coil spring 98 which is disposed between cam follower 88 and shoulder portion 96. Spring 98 biases the cam follower 88 in the direction of arrow A as shown in FIG. 12 so that dowel pins 90 each engage an end of cam slots 92.

The rivet delivery device 60 includes a rear cylinder cap 100 which is provided with a first fitting 102 which communicates with a piston chamber 104 through passage 106 for providing pressurized gas to the chamber 104 and thereby driving piston 76 in the direction of arrow B. A second fitting 108 is provided in the cylinder cap 100 which communicates via a passage 109 with a tube 110 which extends into a central passage 112 in rod 72. An O-ring 113 is provided between the tube 110 and central passage 112. A pair of pneumatic tubes 115a, 115b (shown in FIG. 3) are connected to first and second fittings 102, 108, respectively, for controllably operating the rivet delivery device 60. As pressurized air is delivered through pneumatic tube 115a and first fitting 102, the piston 76 is driven in the direction of arrow B whereby rod 72 extends out of the body tube 70. As the piston stop 82 engages cam follower 88, cam follower 88 presses against the bias of the spring 98. As the dowel pins 90 follow the generally helical profile of the cam slots 92, the cam follower 88, and thus the rod 72 are caused to rotate.

Figure 6:
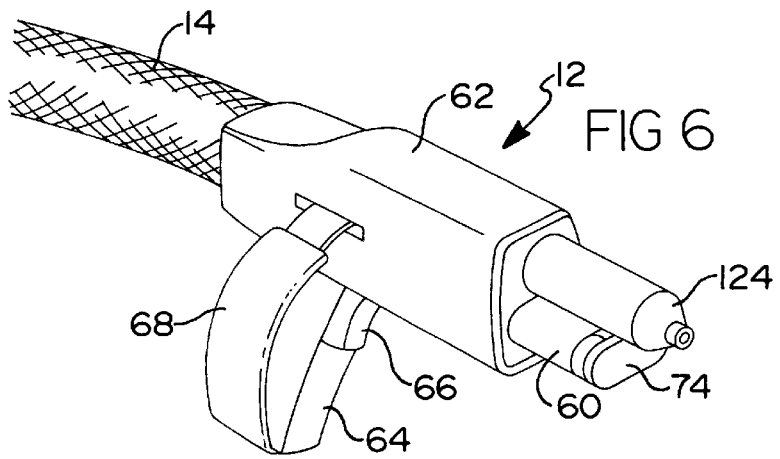
FIGS. 6–8 each provide a right side perspective view of a rivet setting tool according to the principles of the present invention with the rivet delivery device in three different operating positions, respectively.
Figure 7:
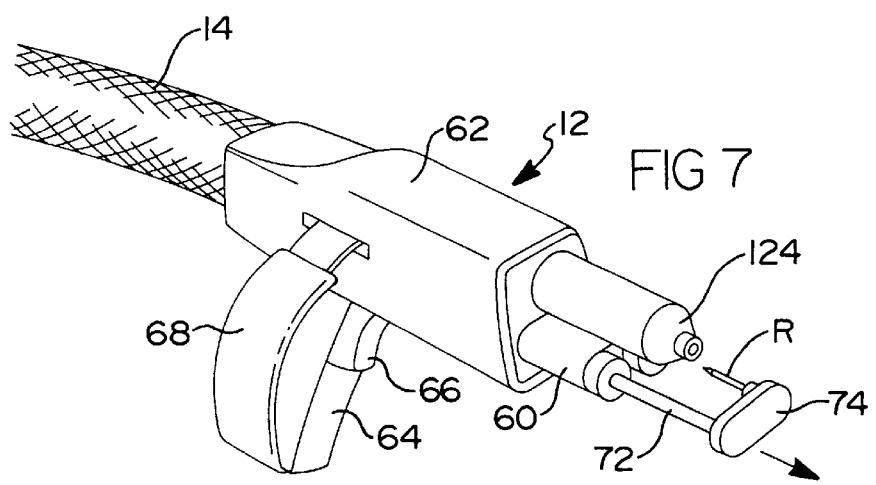
Figure 8:
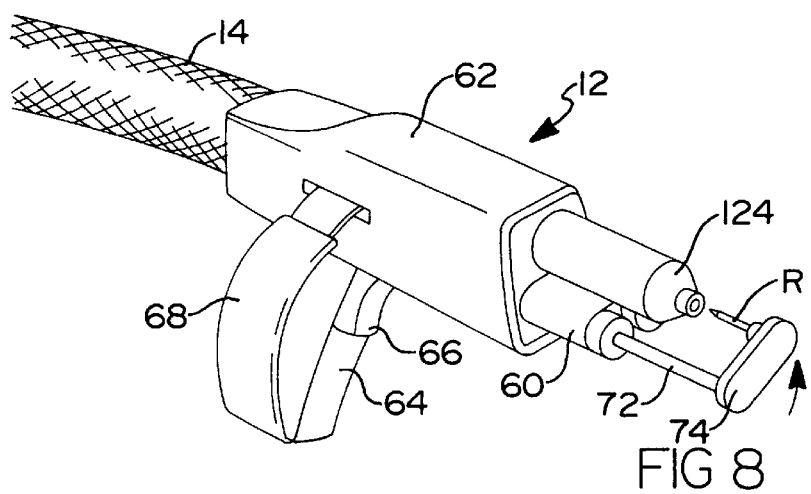

With reference to FIGS. 6 and 9, the rod 72 and delivery arm 74 of rivet delivery device 60 are in the retracted position such as shown in the cross-sectional view of FIG. 12. In the retracted position, a transfer bushing 114 which is provided in the end of delivery arm 74 is disposed opposite the receiver bushing 116 of the rivet delivery tube 30. A suction pressure is applied through pneumatic tube 115b and second fitting 108 which provides a suction through central passage 112 in rod 72 which communicates with a passage 118 in delivery arm 74 which in turn communicates with a central passage 120 in transfer bushing 114. The suction force retains the rivet R after the rivet is transported from the escapement mechanism 26 by the rivet delivery tube 30. At this time, the suction force through second fitting 108 is maintained while pressurized gas is provided through first fitting 102 to cause piston 76 to slide along body tube 70 until piston stop 82 engages cam follower 88. FIGS. 7 and 10 illustrate the orientation of the rod 72 and delivery arm 74 just as the piston stop 82 engages the cam follower 88. At this time, piston stop 82 causes cam follower 88 to move relative to cam sleeve 94 against the biasing force of spring 98 so that the dowel pins 90 travel along generally helical cam slots 92 causing cam follower 88 and rod 72 to rotate relative to cam sleeve 94, so that rod 72 and delivery arm 74 are oriented as illustrated in FIGS. 8 and 11. As the piston 76 reaches its fullest extended position, the rod 72 is fully extended and delivery arm 74 is rotated to be aligned with the nose piece 124 of the pulling adapter and jaw case mechanism 43/44. A positive pressure is then induced through second fitting 108 to blow the rivet R across the gap into the nose piece 124 of the installation tool 43/44 where it is held in place by vacuum.

A third fitting 128 is provided in the rivet delivery device 60 and is connected to a pneumatic tube 130 (see FIG. 3). Third fitting 128 communicates with a second end of piston chamber 104 for providing pressurized gas to the second side of the piston 76 to force the piston 76 to its retracted position whereby the delivery arm 74 is again aligned with the receiver bushing 116 of rivet delivery tube 30 for beginning a reload cycle.

The rear cylinder cap 100 is provided with an O-ring 132 for sealing a first end of piston chamber 104. The cam sleeve 94 is provided with a pair of O-rings 134 which sealingly close off the second end of piston chamber 104. A front end cap 136 is provided in an open end of cam sleeve 94. A TEFLON washer 138 and seal/seal sleeve assembly 140 are provided around the rod 72 within the open end of cam sleeve 94. Piston 76 is provided with a magnetic ring 142 which works in combination with an external sensor (not shown) which senses the position of piston 76. As the piston 76 returns to the retracted position, the external sensor sends a signal to the controller which then activates the escapement mechanism 26 to send another rivet to the tool.

The piston 76 is provided with a pair of bores 146, as shown in FIG. 15. The bores 146 are adapted to be engaged by a rivet delivery device adjustment tool 150 as shown in FIG. 16. Adjustment tool 150 includes a cylindrical main body 152 and a handle 154 mounted to the main body 152 by a cap screw 156. A pair of dowel pins 158 are inset in an end portion of main body 152. In order to adjust the angular travel of rod 72, cylinder cap 100 is removed from body tube 70 and adjustment tool 150 is inserted into the body tube 70 so that dowel pins 158 engage bores 146 of piston 76. By rotating piston 76 relative to rod 72 via the adjustment tool 150, the threaded engagement of the piston 76 to the rod 72 causes piston 76 to adjust the distance between piston stop 82 and piston 76. The distance between piston stop 82 and piston 76 determines the angular travel of rod 72 and delivery arm 74. Thus, the angular orientation of the delivery arm 74, in the fully extended position, can be easily adjusted by simply removing cylinder cap 100 and adjusting the piston 76 using adjustment tool 150.

In order to adjust the "throw" or distance of travel for the rod 72, the piston stop 82 can be adjusted relative to rod 72. In other words, by adjusting the threaded engagement between piston stop 82 and rod 72, the distance between piston stop 82 and cam follower 88 is adjusted. This determines the "throw" of rod 72 and delivery arm 74. Accordingly, in order to utilize the rivet delivery device 60 of the present invention with different sized rivets having different length mandrels, the "throw" of the rivet delivery device can be easily adjusted by pulling the cam sleeve 94 along with rod 72, delivery arm 74 and piston 76 out from body tube 70 so that the piston stop 82 can be rotatably adjusted relative to the threaded portion 78 of rod 72. The "throw" of the rivet delivery device 60 is adjusted when a changeover to a different sized rivet is required. Adjustment of the angular movement of the rod 72 and delivery arm 74 may be necessary if transfer bushing 114 of delivery arm 74 is not properly aligned with the nose piece 124 of the installation tool 126 in the fully extended rivet delivery position. It is anticipated that the rivet delivery device could be modified so that the "throw" could be adjusted in the manner that the angular travel is adjusted and the angular travel could be adjusted in a similar manner that the "throw" is adjusted in the embodiment as discussed above.

Figure 19:
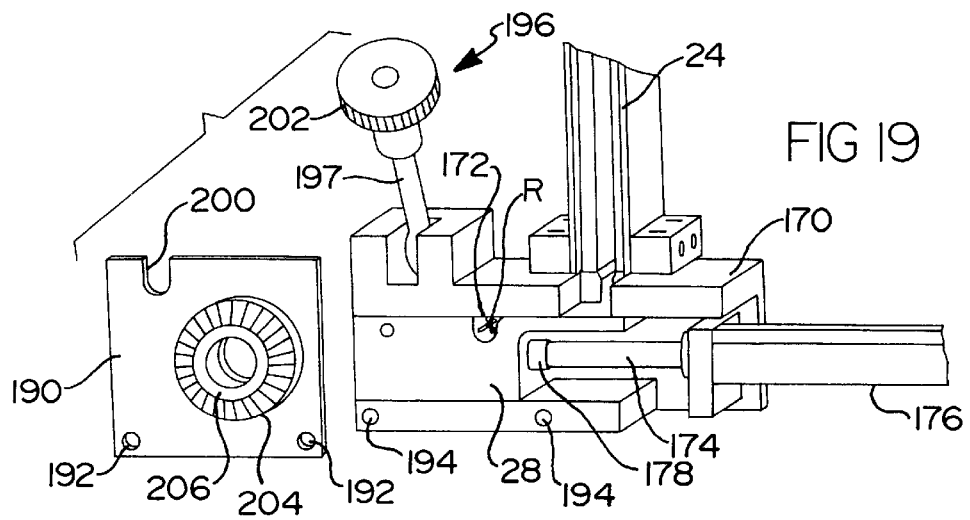
FIG. 19 is a perspective view of the escapement mechanism of the present invention with the top plate removed.
Figure 20:
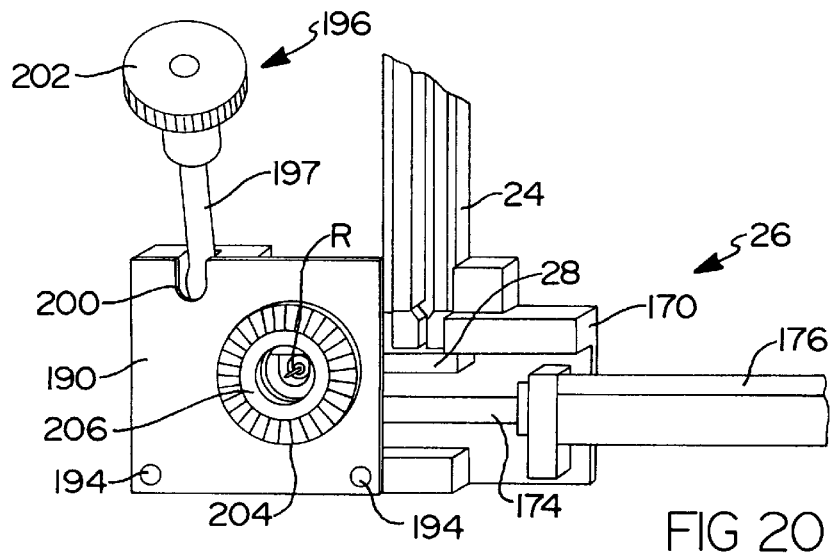
FIG. 20 is a perspective view of the escapement mechanism shown in FIG. 19 with the top plate disposed in its assembled position.

With reference to FIGS. 17–24, the improved escapement mechanism 26 of the present invention will now be described. Escapement mechanism 26 includes an escapement housing 170 which is mounted at a bottom portion of track 24. A rivet nesting block 28 is slidably received in the escapement housing 170 and includes a recessed portion 172 for receiving and supporting a rivet R. Nesting block 28 is connected to a drive rod 174 which is connected to a piston (not shown) which is disposed in a pneumatic cylinder 176. Drive rod 174 includes an end fitting 178 having a head portion which is received in an elongated slot 180 disposed in a side of the nesting block 28. Slot 180 has a T-shaped cross section for receiving the head portion of end fitting 178. Recessed rivet receiving slot 172 has a shoulder portion 182, as shown in FIG. 23 on which the rivet flange rests, and a mandrel receiving slot portion 184 which receives a mandrel therein. The rivet receiving slot 172 and mandrel receiving slot 184 are each provided with a beveled edge portion 172a, 184a, respectively. The beveled edge portions 172a, 184a provide a camming surface to roll the second rivet in line out of the way and push it back up the track 24 as the nesting block 28 moves to a delivery position, thus preventing a jam in the escapement mechanism 26. The nesting block 28 is removable from the escapement housing 170 as shown in FIG. 19 simply by lifting upward on the nesting block 28 so that the end fitting 178 of drive rod 174 is slid free of slot 180. During a changeover, in order to utilize the escapement mechanism 26 of the present invention with different sized rivets, nesting blocks 28 having different sized rivet receiving slots 172 can be quickly and easily changed and connected to the end fitting 178 of drive rod 174.

Nesting block 28 is secured within escapement housing 170 by placing a top plate 190 over escapement housing 170. Top plate 190 includes a pair of holes 192 which receive locating pins 194 which extend upward from escapement housing 170. Locating pins 194 hold top plate 190 in place as a thumb screw assembly 196 secures the top plate 190 to the escapement housing 170. Thumb screw assembly 196 includes a swing bolt 197 pivotally mounted to the escapement housing 170 by a pivot pin 198. Swing bolt 197 is received within a slot 200 disposed in a side of the top plate 190 and the thumb nut 202 is tightened downwardly onto the top surface of top plate 190.

A clamp ring 204 is provided on the top plate 190 and surrounds an escapement guide tube 206. The rivet delivery tube 30 is attached to the escapement guide tube 206 and held in place with clamp ring 204. A source of pressurized air in the form of pneumatic tube 208 is provided in the bottom of escapement housing 170 which forces a rivet R which is in the rivet receiving slot 172 through rivet delivery tube 30. The nesting block 28 is movable from a first loading position, wherein a rivet is received from track 24 and supported in the rivet receiving slot 172 of nesting block 28. Cylinder 176 is then pressurized via pneumatic tube 210 (see FIG. 3) to force the drive rod 174 to move the nesting block 28 to a second, rivet delivery position, wherein the rivet receiving slot 172 communicates with the pneumatic tube 208 and the escapement guide tube 26 disposed on top plate 190 so that rivet R is delivered through rivet delivery tube 30. Another source of pressurized gas communicates with cylinder 176 via pneumatic tube 211 (see FIG. 3) for returning the drive rod 174 and nesting block 28 to the hose or loading position.

During a changeover to a different sized rivet, or during cleaning or maintenance, the top plate 190 can be easily removed from escapement housing 170 by loosening thumb nut 202 and pivoting the swing bolt 197 away from the top plate 190 so the top plate 190 can be picked up off of escapement housing 170. At this time, nesting block 28 can be removed by simply lifting upward on the nesting block 28 to disengage the nesting block 28 from the end fitting 178 of drive rod 174 as fitting 178 slides out of slot 180. The rapid changeover, cleaning and maintenance capabilities which are provided by the improved escapement mechanism 26 enhances the efficiency of the riveting system of the present invention.

With reference to FIG. 3, the rivet setting tool 12 includes a pulling head 43 which includes a hydraulic piston 43a within a machined aluminum housing 43b. The piston is connected to jaw case 44 via a coupling so that during activation, i.e., hydraulic pressure supplied by a hydraulic hose 212 on the face of the hydraulic piston 43a, the jaws 44 ramp off a nose piece, and engage the rivet mandrel. Continued travel provides enough force and stroke to effectively set the average rivet. The pulling head 43 employs air pressure via pneumatic tube 214 on the opposite side of the hydraulic piston 43a to return the piston 43a to its full forward position once hydraulic pressure is removed.

Figure 25:
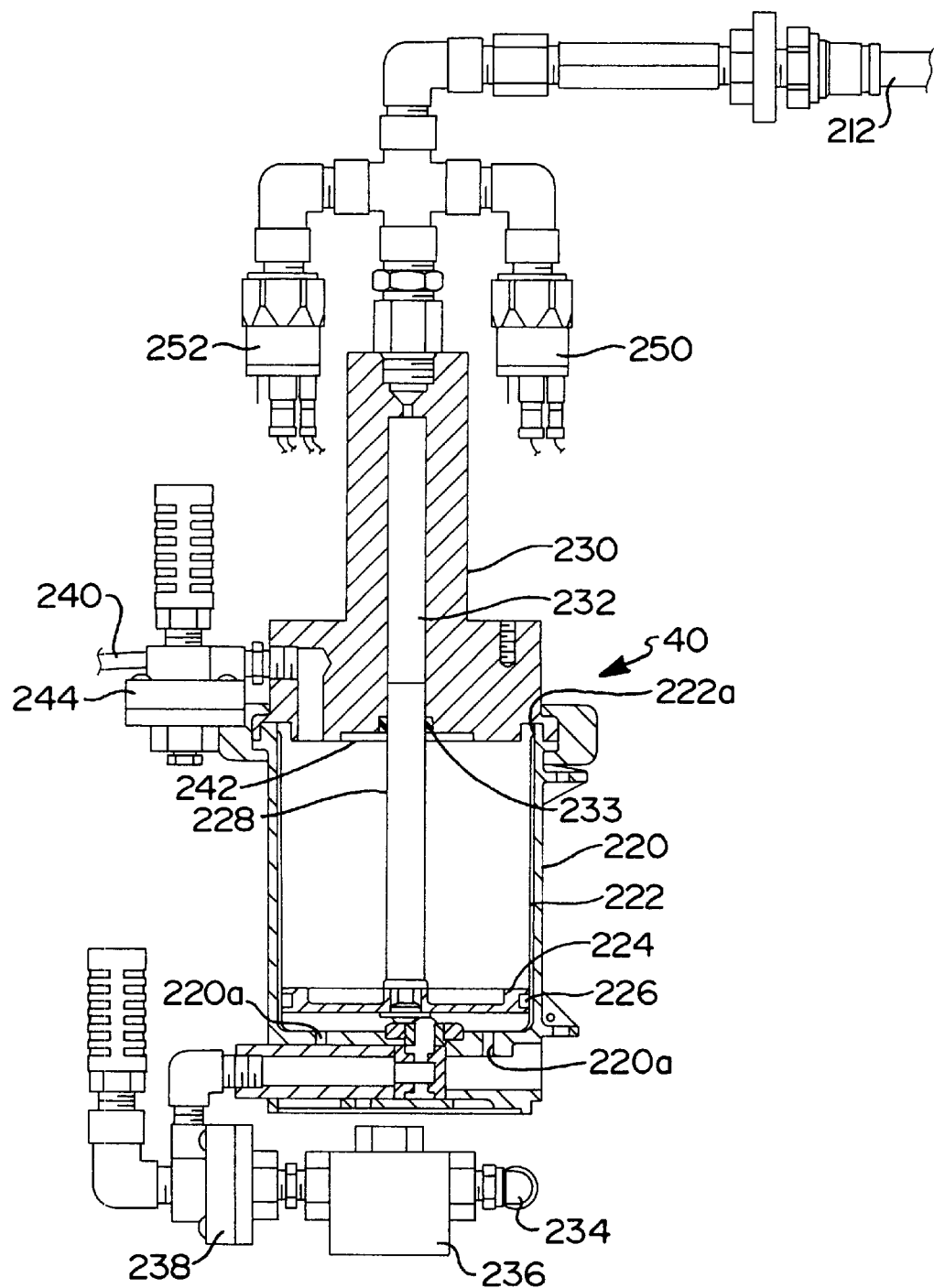
FIG. 25 is a cross-sectional view of the remote intensifier according to the principles of the present invention.
Figure 26:
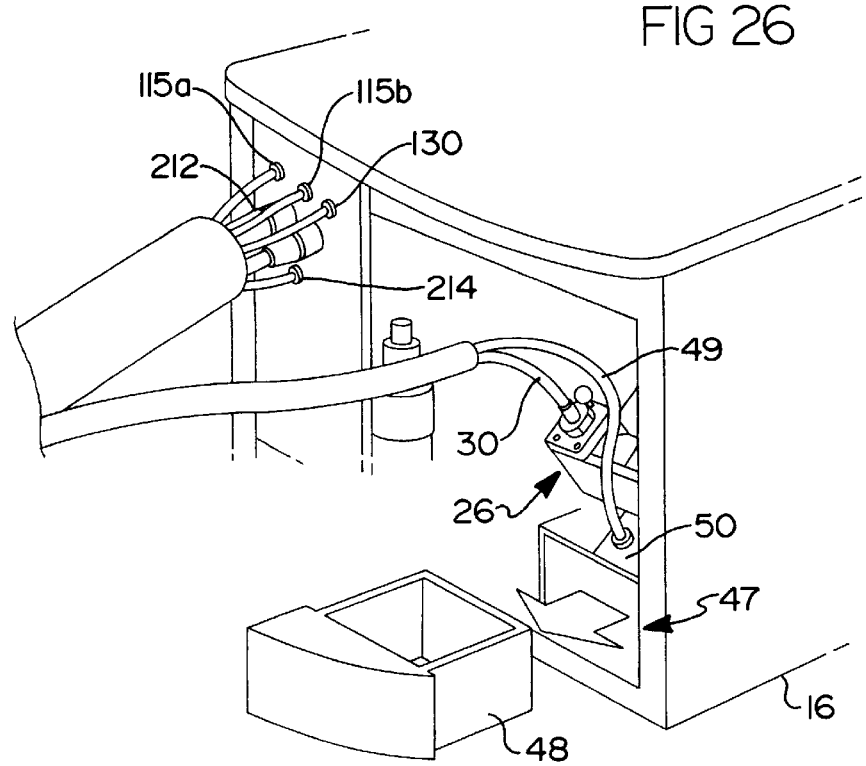
FIG. 26 is a perspective view of the portable autofeed riveting system according to the principles of the present invention, illustrating the connections of the umbilical assembly of the present invention.

The hydraulic supply hose 212 is connected to the remote intensifier 40. As shown in FIG. 25, the remote intensifier 40 includes an intensifier chamber 220 which is provided with an intensifier chamber sleeve 222. An air piston 224 is slidably received in the intensifier chamber 220 and is provided with a seal 226 which engages intensifier chamber sleeve 222. A rod 228 is attached to air piston 224 and extends into a sealed cylindrical opening in a ram housing 230 which is filled with hydraulic oil 232. A seal 233 is provided between the rod 228 and the housing 230. A source of pressurized air in the form of pneumatic tube 234 is connected to a valve 236 which is connected to a quick dump exhaust valve 238 which communicates with a first end of intensifier chamber 220. A second supply of pressurized air in the form of pneumatic tube 240 is provided in communication with a second end 242 of intensifier chamber 220. A quick dump exhaust valve 244 is provided in communication with the second end 242 of intensifier chamber 220. The ram housing 230 is connected to the hydraulic hose 212 by a plurality of fittings.

A high pressure hydraulic pressure switch 250 and a low pressure hydraulic pressure switch 252 are provided in communication with the hydraulic fluid passage 212. Air pressure applied to the air piston 224 forces the rod 228 to displace a column of hydraulic oil 232 with a smaller cross-sectional area. The volume of air acting on the area of the piston forces the piston 224 and rod 228 upward. The differential in area between the air piston 224 and the top of the rod 228 allows the generation of a high hydraulic pressure from a low air pressure.

As the air piston 224 moves upward, exhaust dump valve 244 opens to vent air building up on top of the piston 224. The high pressure column of oil 232 flows through the hydraulic hose 212, and forces the hydraulic piston 43a of pulling head 43 back, thus setting the rivet.

Upon mandrel break, as detected by hydraulic switches 250 and 252 as described herein, the controller 34 stops activating the valve 236, and starts activating a remote valve (not shown) supplying a regulated supply of air through quick dump exhaust valve 244 and on top of air piston 224. The combination of the air behind the piston 43a of the pulling head 43 disposed within the rivet setting tool 12, and the air bubble on top of the air piston 224 quickly returns the pulling head 43 and jaw case 44 to the retracted position. Return air on top of the air piston 224 cannot build up in pressure since the top or second end 242 of the chamber 220 is vented out around the intensifier chamber sleeve 222 and out to atmosphere. The sleeve 227 is provided with a plurality of recess portions 222a at an upper edge thereof forming vent passages. The chamber 220 is provided with a plurality of vent holes 220a in a lower portion thereof. The differential in the air flow entering the top of the chamber 220, versus its ability to leak out past the sleeve 222 is what assists the air piston 224 in returning. Without venting the air in the upper portion of intensifier chamber 220, it would be possible to supply too much pressure to the top of the air piston 224 which could draw the rod 228 out too fast, and force the introduction of air into the hydraulic passage past the seal 233. The venting of the top portion 242 of the intensifier chamber 220 to atmosphere limits that possibility by limiting pressure build up. Air supply to the top of the air piston 224 is controlled by the riveting system controller 34 and shuts off after approximately one second.

In order to achieve a rapid loading and setting cycle, the remote intensifier design of the present invention provides a low pressure bubble of air on top of the intensifier piston 224 to assist the return of the entire system, and cut the return speed of the pulling head 43 of the installation tool 126. By utilizing the intensifier 40 of the present invention, the return speed has been cut approximately in half in comparison to simply utilizing air pressure on the back of the piston of the pulling head 43 forcing the oil in front of the piston of the pulling head 43 back through the hose 212 and pressing air piston 224 back to its beginning position.

The rivet setting and mandrel collecting sequence of events is described with reference to FIG. 3. When trigger 66 is depressed, the controller 34 activates the remote intensifier 40 to supply hydraulic fluid to the pulling head 43 to drive the pulling head 43 back. At the time the trigger 66 is depressed, the controller 34 starts a "rivet setting" window or time period. The jaw case 44 then engages the rivet mandrel and starts the setting process. As hydraulic pressure builds, the high and low pressure switches 250, 252, respectively, witness the increase in pressure as setting occurs, and set a latch. When the high pressure switch 250 drops low again, the controller deduces that the rivet has been set.

Figure 27:
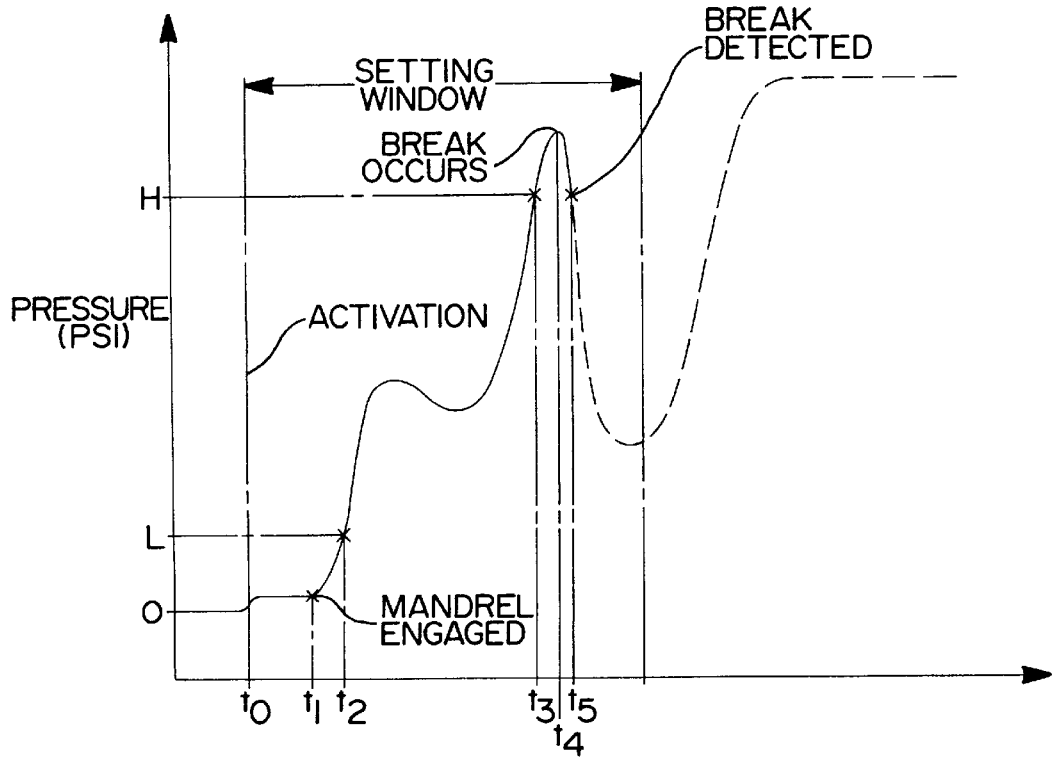
FIG. 27 is an illustration of a typical rivet set signature with the hydraulic pressure plotted over time and illustrating the window during which the detection of a mandrel is sensed.

FIG. 27 shows a typical rivet set signature wherein at time $t_0$ activation of the trigger 66 begins a rivet setting sequence and a rivet setting window is started. At time $t_1$, the mandrel is engaged by the jaws 44 and the hydraulic pressure begins to build low pressure. Low pressure switch 252 senses the hydraulic pressure rising above the low pressure limit $P_L$ at time $t_2$ while the high pressure sensor 250 senses the hydraulic pressure climbing above the high pressure limit $P_H$ at time $t_3$. At time $t_4$, the mandrel breaks and the hydraulic pressure rapidly drops and at time $t_5$, the pressure drops below the high pressure limit $P_H$ and is sensed by the high pressure switch 250 and the controller 34 deduces that the rivet has set. At this time, activation pressure to the remote intensifier 40 stops and return air is started, causing the tools pulling head 43 to return concurrently. The controller 34 starts a mandrel collection window to monitor the collection of the mandrel M. The time interval can be set, for example, at twenty-fifty percent longer than the nominal time for the mandrel to be fully released and collected (for example approximately three seconds for a typical mandrel collection time of two seconds). The tool jaws 44 open as the pulling head 43 returns and the mandrel M is released and a vacuum pressure draws the mandrel past the mandrel sensor 50 and into the collection bin 44. As the mandrel passes the mandrel sensor 50, the mandrel collection window is reset The rivet delivery device 60 loads a new rivet into the nose piece 124 of the tool as the tool returns full forward. Since the high setting/loading speed makes it possible to have as many as two mandrels in the collection path at once, two (or sometimes more) separate mandrel collection windows are required. With two mandrel collection windows, the first mandrel collection window becomes available for a third rivet as soon as the first mandrel passes the mandrel sensor 50. These two timers (or windows) are continuously reused again and again throughout the process. If a jam were to inhibit collection of the mandrels, this would be witnessed by the mandrel collection window timing out before the mandrel sensor 50 detects a mandrel's passage. With two mandrel collection windows, there could be as many as two mandrels in the path, but no more since this fault inhibits all setting functions until cleared and reset.

The rivet setting tool 12 uses no sensor to determine if there is a rivet loaded in the tool. The control system assumes the rivet device achieves loading on every attempt. It is during the setting process that this is proven true, or not, by monitoring the pressure switches 250, 252. If the switches 250, 252 detect pressure within the riveting setting window, i.e., within an amount of time for the pulling head 43 to travel almost fully back (for example 40 ms), it knows a rivet was present and proceeds as above. If there were no rivet in the nose piece 124 when the trigger 66 is activated, the switches 250, 252 would see no build-up of pressure within the rivet setting window and would not start a mandrel collection window, but would rather initiate the rivet delivery device 60 reloading sequence. As compared with prior automated rivet setting systems which utilize a mandrel collection system, the control sequence of the present invention improves the speed of operation of the rivet setting system. With previous systems, the rivet setting tool was not allowed to reload until the previously spent mandrel is received past the mandrel sensor. However, with the present invention, it is possible to set a first rivet and to subsequently set a second rivet prior to the mandrel reaching the mandrel sensor associated with the mandrel collection system. Thus, the operator does not have to wait for the mandrel to be sensed before applying a second rivet.

Furthermore, with the control system of the present invention, once a mandrel break is detected, the supply of hydraulic pressure to the pulling head can be halted so that the pulling head can be immediately returned to its starting position, ready to begin another rivet setting sequence. Thus, the speed of operation of the rivet setting tool of the present invention is increased since the system does not have to wait any longer than necessary to reset itself after mandrel break is detected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rivet setting tool, comprising:
    a rivet passage;
    a nose piece having an opening for receiving a mandrel of a rivet therein;
    a pulling head and jaw case mechanism for gripping and tensioning a mandrel received through said nose piece;
    a rivet delivery device for transferring a rivet from said rivet passage to said nose piece, said rivet delivery device including:
        a housing body;
        a piston slidably disposed in said housing body;
        a rod having a first end attached to said piston;
        a delivery arm attached to said rod,
        a cam sleeve disposed within said housing body;
        a cam follower slidably engaged with said rod and in cammed engagement with said cam sleeve; and
        a piston stop engaged with said rod, said piston stop being engagable with said cam follower to drive said cam follower relative to said cam sleeve upon said rod being moved a predetermined distance relative to said cam sleeve, said cam follower causing said rod to rotate as said cam follower moves relative to said cam sleeve.

2. The rivet setting tool according to claim 1, wherein an axial adjustment of said piston stop relative to said rod adjusts a travel distance of said rod relative to said housing body.

3. The rivet setting tool according to claim 1, wherein said rod has a hollow passage therethrough which communicates with a passage in said delivery arm, wherein a vacuum source communicates through said passages in said rod and said delivery arm for applying a suction force for attracting a rivet from said rivet passage.

4. The rivet setting tool according to claim 1, wherein said piston is axially adjustably attached to said rod, whereby adjustment of a distance between said piston and said piston stop adjusts the angular travel of said delivery arm.

5. The rivet setting tool according to claim 4, wherein said piston includes a tool engaging portion in an axial end portion thereof.

6. The rivet setting tool according to claim 4, further comprising a spring for biasing said cam follower relative to said cam sleeve.

7. The rivet setting tool according to claim 1, further comprising a spring for biasing said cam follower relative to said cam sleeve.

8. The rivet setting tool according to claim 1, said cam sleeve includes a cam groove engaged by said cam follower.

9. A rivet delivery device for transferring a rivet from a rivet passage to a nose piece of a pulling head and jaw case mechanism, comprising:
    a housing body;
    a piston slidably disposed in said housing body;
    a delivery rod attached to said piston;
    a delivery arm attached to said delivery rod,
    a first cam member disposed within said cylinder body;
    a second cam member slidably engaged with said rod and in cammed engagement with said first cam member;
    a stop member engaged with said delivery rod, said stop member being engagable with one of said first and second cam members to drive said one of said first and second cam members relative to the other of said first and second cam members upon said delivery rod being moved a predetermined distance relative to said housing body, said one of said first and second cam members causing said delivery rod to rotate upon said one of said first and second cam members moving relative to the other of said first and second cam members.

10. The rivet delivery device according to claim 9, wherein an axial adjustment of said piston relative to said delivery rod adjusts an angular roll distance of said delivery rod.

11. The rivet delivery device according to claim 9, wherein an axial adjustment of said piston stop relative to said delivery rod adjusts a travel distance of said rod relative to said cylinder body.

12. The rivet delivery device according to claim 11, wherein said piston includes a tool engaging portion in an axial end portion thereof.

13. The rivet delivery device according to claim 9, further comprising a spring for biasing said first cam member relative to said second cam member.

14. A rivet setting tool, comprising:
    a rivet passage;
    a nose piece having an opening for receiving a mandrel of a rivet therein;

a pulling head and jaw case mechanism for gripping and tensioning a mandrel received through said nose piece;

a rivet delivery device for transferring a rivet from said rivet passage to said nose piece, said rivet delivery device including:

a housing body;

a piston slidably disposed in said housing body;

a delivery rod attached to said piston;

a delivery arm attached to said delivery rod, a first supply of pressurized gas communicating with a first portion of said housing body on a first side of said piston;

a second supply of pressurized gas communicating with a second portion of said housing body on a second side of said piston;

wherein said piston and said delivery rod are driven in a first direction by activating said first supply of pressurized gas and said piston and said delivery rod are driven in a second direction by activating said second supply of pressurized gas;

a first cam member disposed within said housing body and a second cam member slidably engaged with said rod and in cammed engagement with said first cam member; and a stop member engaged with said delivery rod, said stop member being engagable with one of said first and second cam members to drive said one of said first and second cam members relative to the other of said first and second cam members upon said delivery rod being moved a predetermined distance relative to said housing body, said one of said first and second cam members causing said delivery rod to rotate upon said one of said first and second cam members moving relative to the other of said first and second cam members whereby an axial adjustment of said piston stop relative to said rod adjusts a travel distance of said rod relative to said cylinder body.

15. The rivet setting tool according to claim 14, further comprising a spring for biasing said cam follower relative to said cam sleeve.

16. A rivet setting tool, comprising:

a rivet passage;

a nose piece having an opening for receiving a mandrel of a rivet therein;

a pulling head and jaw case mechanism for gripping and tensioning a mandrel received through said nose piece;

a rivet delivery device for transferring a rivet from said rivet passage to said nose piece, said rivet delivery device including:

a housing body;

a piston slidably disposed in said housing body;

a delivery rod attached to said piston;

a delivery arm attached to said delivery rod, a first supply of pressurized gas communicating with a first portion of said housing body on a first side of said piston;

a second supply of pressurized gas communicating with a second portion of said housing body on a second side of said piston;

wherein said piston and said delivery rod are driven in a first direction by activating said first supply of pressurized gas and said piston and said delivery rod are driven in a second direction by activating said second supply of pressurized gas; and wherein said rod has a hollow passage therethrough which communicates with a passage in said delivery arm, wherein a vacuum source communicates through said passages in said delivery rod and said delivery arm for applying a suction force for attracting a rivet therein.

* * * * *